(12) United States Patent
Kamath et al.

(10) Patent No.: US 11,528,188 B2
(45) Date of Patent: Dec. 13, 2022

(54) GRAPHICALLY MANAGING A NETWORKING DEVICE CONFIGURATION

(71) Applicant: HEWLETT PACKARD ENTERPRISE DEVELOPMENT LP, Houston, TX (US)

(72) Inventors: Harish B. Kamath, Bengalooru (IN); Kuldeep Sharma, Bangalore (IN); Brajendra Bajpai, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/860,794

(22) Filed: Apr. 28, 2020

(65) Prior Publication Data
US 2020/0389358 A1 Dec. 10, 2020

(30) Foreign Application Priority Data
Jun. 7, 2019 (IN) .............................. 201941022770

(51) Int. Cl.
*G06F 15/16* (2006.01)
*H04L 41/084* (2022.01)
*H04L 41/08* (2022.01)
*H04L 45/586* (2022.01)
*H04L 41/22* (2022.01)
*H04L 41/0654* (2022.01)
(Continued)

(52) U.S. Cl.
CPC ...... *H04L 41/0843* (2013.01); *H04L 41/0672* (2013.01); *H04L 41/0886* (2013.01); *H04L 41/22* (2013.01); *H04L 45/586* (2013.01); *H04L 51/214* (2022.05); *H04L 67/303* (2013.01)

(58) Field of Classification Search
CPC ............ H04L 41/0843; H04L 41/0886; H04L 45/586; H04L 41/22; H04L 41/0672
USPC ........................................................ 709/231
See application file for complete search history.

(56) References Cited

U.S. PATENT DOCUMENTS 6,570,867 B1   5/2003  Robinson et al.
7,856,599 B2   12/2010 Proulx et al.
(Continued)

OTHER PUBLICATIONS

Cisco, "Configuring the Router", Chapter 4, Cisco 2900 and 3900 Series Hardware Installation, Cisco Systems, Inc, 2015, 26 pages.
(Continued)

*Primary Examiner* — Karen C Tang
(74) *Attorney, Agent, or Firm* — Trop, Pruner & Hu, P.C.

(57) ABSTRACT

A computing device may perform a method that includes graphically presenting a plurality of virtual routing and forwarding (VRF) elements which represent a plurality of stored VRF profiles, with each VRF element presenting profile data from one of the plurality of stored VRF profiles. The method may further include receiving input selecting a VRF element which represents and presents profile data from a selected stored VRF profile and receiving input modifying the profile data presented by the selected VRF element. A VRF profile may be generated, for a networking device of a networking infrastructure, based on the selected stored VRF profile and the input modifying the profile data presented by the selected VRF element. Thereafter, a VRF element may be graphically presented which represents and presents profile data from the generated VRF profile for the networking device.

21 Claims, 10 Drawing Sheets

(51) Int. Cl.
    *H04L 67/303*    (2022.01)
    *H04L 51/214*    (2022.01)
    *G06F 15/173*    (2006.01)

(56) References Cited

U.S. PATENT DOCUMENTS

| | | |
|---|---|---|
| 8,089,897 B2 | 1/2012 | Qian et al. |
| 8,230,047 B2 | 7/2012 | Pibhai et al. |
| 9,716,628 B2 | 7/2017 | Sikand et al. |
| 10,050,876 B2 | 8/2018 | Kapadia et al. |
| 10,198,142 B1* | 2/2019 | Lappas .................. G06Q 10/06 |
| 2011/0173303 A1* | 7/2011 | Rider .................. G06F 9/44505 |
| | | 709/220 |
| 2017/0317954 A1 | 11/2017 | Masurekar et al. |
| 2020/0007582 A1* | 1/2020 | Dixit ....................... H04L 63/20 |
| 2020/0007583 A1* | 1/2020 | Dixit ....................... H04L 63/20 |

OTHER PUBLICATIONS

Nortel Networks, "Configuring IP Routing Operations", Passport 8000 Series Software Release 3.7, May 2004, pp. 1-532.

* cited by examiner

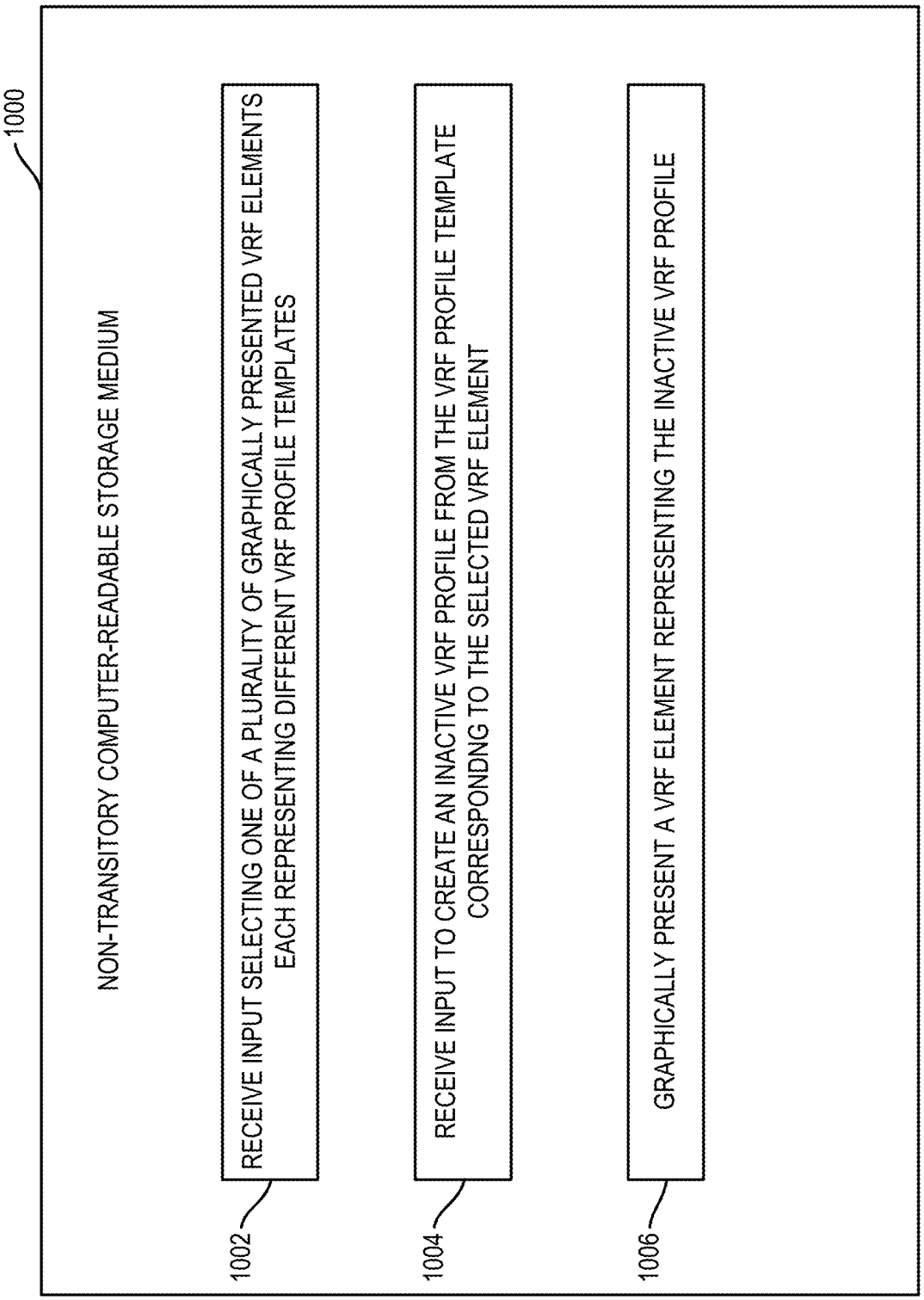

GRAPHICALLY MANAGING A NETWORKING DEVICE CONFIGURATION

BACKGROUND

A networking infrastructure can be used to transmit data between source and destination devices that are physically and logically connected to the networking infrastructure. One or more networking devices can be used to route data from a source device toward a destination device, when the source and destination devices are not directly connected together within the networking infrastructure. The manner in which a networking device routes data depends, at least in part, on capabilities and configuration of the networking device. For example, a networking device may be configured to operate using one or more protocols to properly route data between a source device and a destination device. Additionally, the networking device may be configured with one or more physical and logical connections with other devices in the networking infrastructure to facilitate routing data between a source device and a destination device.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion. Features of the present disclosure are illustrated by way of example and not limited in the following figures, in which like numerals indicate like elements, in which:

FIG. 10 depicts a non-transitory computer-readable storage medium storing executable instructions for graphically managing a networking device configuration, according to one or more examples of the present disclosure.

DETAILED DESCRIPTION

Figure 1:
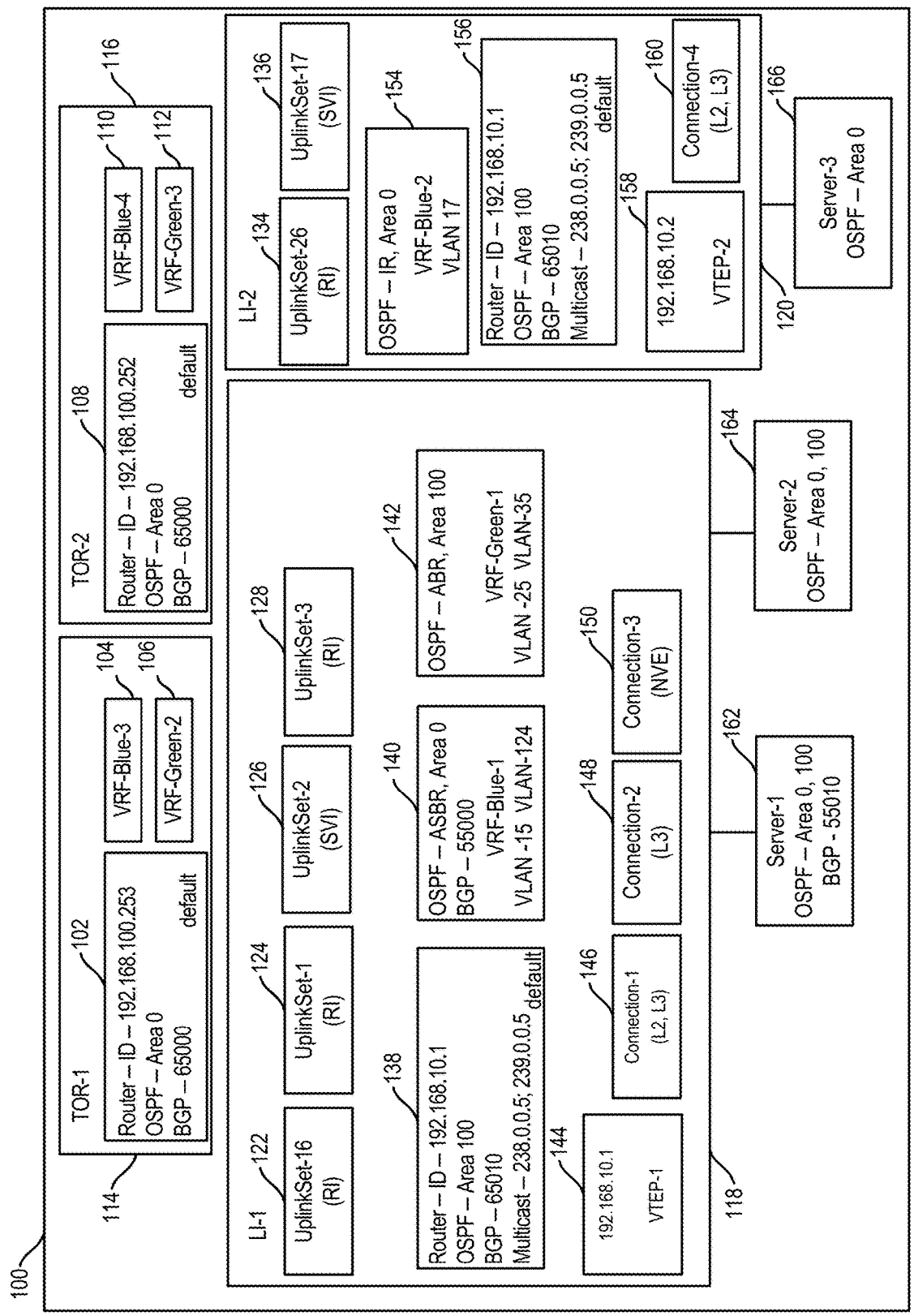
FIG. 1 depicts a graphically presented portion of a networking infrastructure, according to one or more examples of the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Configuring networking devices within a networking infrastructure is one aspect of network management, which may be performed by an administrator. Configuring a networking device to properly and efficiently route data within the networking infrastructure may be a complex task, particularly in a networking infrastructure that includes hundreds of devices that may have thousands of associated physical and logical connections and may implement multiple protocols. However, some mechanisms that an administrator may use to configure a networking device are limited in that the networking device is configured discretely at its control plane.

For example, an administrator may use Command Line Interface (CLI) scripts to configure a networking device, which are command driven, text-based user interfaces to the networking device. CLI scripts may be error prone and difficult to debug and provide limited visibility of how the networking device is to be connected to other devices in the networking infrastructure. This limited visibility makes it difficult to apply properties across similar networking devices or within a hierarchy of networking devices of the networking infrastructure. This limited visibility further makes it difficult to troubleshoot any errors that may arise while configuring the networking device, particularly given variances in protocol specifics.

Disclosed herein are methods and hardware for graphically managing a networking device configuration. In an example, a computing device may perform a method that includes graphically presenting a plurality of virtual routing and forwarding (VRF) elements which represent a plurality of stored VRF profiles, with each VRF element presenting profile data from one of the plurality of stored VRF profiles. The method may further include receiving input selecting a VRF element which represents and presents profile data from a selected stored VRF profile and receiving input modifying the profile data presented by the selected VRF element. A VRF profile may be generated, for a networking device of a networking infrastructure, based on the selected stored VRF profile and the input modifying the profile data presented by the selected VRF element. Thereafter, a VRF element may be graphically presented which represents and presents profile data from the generated VRF profile for the networking device.

One or more VRF elements may be graphically presented as, by, or within a graphical user interface (GUI) that enables an administrator to configure one or more networking devices, such as one or more routers or switches (with routing capabilities), of a networking infrastructure. Graphically presenting the VRF elements enables the administrator to view profile data from one or more of the stored VRF profiles in order to configure a networking device or correct a configuration for a networking device. The GUI can present different views of the plurality of VRF elements, which present different combinations of the profile data from the plurality of stored VRF profiles. One example view may present VRF elements representing stored VRF profiles for multiple networking devices within a networking infrastructure. Another view may present VRF elements representing stored VRF profile templates associated with multiple enterprise users of the networking infrastructure. Another view may show a status indicator that indicates deployment of one of more VRF profiles within one or more networking devices, including whether the deployment was with or without error. Yet another view may show connectivity between multiple devices in the networking infrastructure.

Graphically presenting the one or more VRF elements may allow a networking device to be more efficiently configured by enabling the networking device to be configured at its management plane in the context of other devices within a networking infrastructure. For instance, a VRF profile template may be used to create a VRF profile that may be deployed as a VRF instance on a networking device, thereby configuring the networking device. In a particular example, a VRF profile template is referred to as a "VRF-Group" which may be used to configure a group of networking devices, for instance for a particular enterprise user. In this manner, a group of networking devices may include common properties from the VRF-Group, which facilitate creating and grouping multiple VRF instances across multiple networking devices. However, although each VRF instance of a VRF-Group may have the common properties or attributes, one or more VRF instances of the VRF-Group may include properties or attributes independent of the VRG-Group. In an example, configuring the networking device at its management plane using graphically presented VRF elements enables visibility to quickly apply properties across similar networking devices or within a hierarchy of networking devices of the networking infrastructure, while minimizing configuration errors. In another example, if configuration errors do arise, configuring the networking device at its management plane using graphically presented VRF elements enables visibility to more efficiently determine and correct the errors.

Turning now to the drawings, FIG. 1 depicts a graphically presented portion of a networking infrastructure, according to one or more examples of the present disclosure. The examples herein illustrate graphically presenting elements such as VRF elements using a GUI. In a further example, graphically presenting elements such as VRF elements may be realized using an application program interface API that conforms to a Representational State Transfer software architecture style or a "REST API" or in some other manner. In a particular example, the GUI is built over a REST API. Illustrated in FIG. 1 is a GUI view 100 that depicts a plurality of networking device elements 114, 116, 118, and 120, also referred to herein as "networking elements," representing physical networking devices and at least part of their configurations. GUI view 100 further depicts device elements 162, 164, and 166 representing physical devices, which may operate as source and/or destination devices for data. Accordingly, "networking device" as used herein refers to a physical device and its associated hardware, which may be configured using software code and/or data. Further graphically presented in GUI view 100 is a plurality of VRF elements that may be used for managing the configuration of one or more of the networking devices, in accordance with the present disclosure. A VRF element is a graphical construct that represents a stored VRF profile (or VRF configuration) containing profile (or configuration) data. A VRF profile may be deployed on a networking device to configure the networking device by creating a VRF routing table instance or simply "VRF instance" on the networking device. The VRF element graphically presents at least some of the profile data of the associated VRF profile and VRF instance.

Configuration details illustrated in GUI view 100 include routing protocols implemented by the networking devices. Examples of routing protocols that may be implemented by a networking device include, but are not limited to, Open Shortest Path First (OSPF), Border Gateway Protocol (BGP), equal-cost multi-path routing (ECMP), Intermediate System to Intermediate System (IS-IS), Routing Information Protocol (RIP), etc. Other configuration details include Virtual Local Area Network (VLAN) configurations, interface and port configurations, default VRF configurations, Internet Protocol (IP) addresses, and autonomous system (AS) number servicing. Additional configuration details (not shown) may be graphically included in the GUI view 100, based on design preference for instance. The graphically presented configuration details may assist an administrator in managing the networking infrastructure, including managing the networking (and other) devices therein and their configurations and/or connections.

Networking elements 114 and 116 represent two top of rack (TOR) switches respectively identified as "TOR-1" and "TOR-2." Networking elements 118 and 120 represent two routers or logical interconnects (LIs) respectively identified as "LI-1" and "LI-2." Device elements 162, 164, and 166 represent three servers respectively identified as "Server-1," "Server-2," and "Server-3."

Networking element 114 includes a VRF element 102 representing a default VRF profile and VRF instance identified as "default," a VRF element 104 representing a VRF profile and VRF instance identified as "VRF-Blue-3," and a VRF element 106 representing a VRF profile and VRF instance identified as "VRF-Green-2." Networking element 116 includes a VRF element 108 representing a default VRF profile and VRF instance identified as "default," a VRF element 110 representing a VRF profile and VRF instance identified as "VRF-Blue-4," and a VRF element 112 representing a VRF profile and VRF instance identified as "VRF-Green-3." The VRF elements depicted in GUI view 100 may present all or some of the profile data including routing protocol used (e.g., OSPF, BGP), networking device (e.g., router) identifier (ID), AS (or "Areas") number, IP address, and/or VLAN number.

Networking element 118 includes a VRF element 138 representing a default VRF profile and VRF instance identified as "default," a VRF element 140 representing a VRF profile and VRF instance identified as "VRF-Blue-1," and a VRF element 142 representing a VRF profile and VRF instance identified as "VRF-Green-1." Networking element 118 also includes an endpoint element 144 that represents a VXLAN Tunnel Endpoint (VTEP) identified as "VTEP-1." The default VRF instance represented by the VRF element 138 may be used to handle data to and from VTEP-1. Networking element 118 further includes connection elements 122, 124, 126, 128, 146, 148, and 150. Connection elements 122, 124, 126, and 128 represent interfaces used by the VRF Instances represented by VRF elements 138, 140, and 142 to receive data delivered from one or more uplink sets. The interfaces represented by 122, 124, 126, 128 correspond to physical interfaces, e.g., Ethernet ports, mapped to L2 UplinkSet resources and logical interfaces of the VRF Instance. A logical interface may be typed as a router interface (RI) for a one-to-one connection, a Switched Virtual Interface (SVI) for a one-to-many connection, etc.

As shown, connection element 122 represents a physical interface used by an "UplinkSet-16" to deliver data destined to a VRF instance having a logical interface typed RI. Connection element 124 represents a physical interface used by an "UplinkSet-1" to deliver data destined to a VRF instance having a logical interface typed RI. Connection element 126 represents a physical interface used by an "UplinkSet-2" to deliver data destined to a VRF instance having a logical interface typed SVI. Connection element 128 represents a physical interface used by an "UplinkSet-3" to deliver data destined to a VRF instance having a logical interface typed RI. Connection elements 146, 148, and 150 represent downlink ports (which may connect to Server-1 and Server-2) respectively identified as "Connection-1" which maps a layer 2 (L2) interface and a layer 3 (L3) interface, "Connection-2" which maps to a L3 interface, and "Connection-3" which maps to a Network Virtualization Edge (NVE) configuration on a physical interface that that is used to divert data to VTEP-1.

For example, data may be delivered to and from VRF-Blue-1 instance represented by VRF element 140 as follows. Traffic to and from 124, 126 and 146 may be destined to a VRF-Blue customer. 140 may have logical interfaces typed as RI or SVI. The value of these interfaces brings in relationship between the logical interface on 140 to that of 124, 126 and 146. Let 124 be on port 'eth1' and 126 carrying VLAN-100 and related to a VRF-Blue customer. The RI interface on the VRF-Blue-1 instance would carry 'eth1' and the SVI interface may have VLAN-100 to forward the traffic to and from 124 or 126 on to the corresponding logical interface of the VRF instance. Connection-1, 146 may be configured to carry VLAN-200, the VRF-Blue-1 instance may have a logical interface of type SVI with a value VLAN-200. 126 may be configured to carry traffic from VLAN-300 as well and destined to a VRF-Green customer. SVI, VLAN-300 may be created in 142 to establish the traffic flow to and from 142 and 126.

Networking element 120 includes a VRF element 156 representing a default VRF profile and VRF instance identified as "default" and a VRF element 154 representing a VRF profile and VRF instance identified as "VRF-Blue-2." Networking element 120 also includes an endpoint element 158 that represents a VTEP identified as "VTEP-2." The default VRF instance represented by the VRF element 156 may be used to handle data to and from VTEP-2. Networking element 120 further includes connection elements 134, 136, and 160. Connection element 134 represents a physical interface used by an "UplinkSet-26" to deliver data destined to a VRF instance having a logical interface typed RI. Connection element 136 represents a physical interface used by an "UplinkSet-17" to deliver data destined to a VRF instance having a logical interface typed SVI. Connection element 160 represents a downlink port (which may connect to Server-3) identified as "Connection-4" which maps to a L2 and L3 interfaces.

A networking infrastructure may include additional networking and other devices, ports, and interfaces although not depicted in GUI view 100. Moreover, one or more example benefits of GUI view 100 may be better understood in the context of the following disclosure.

Figure 2:
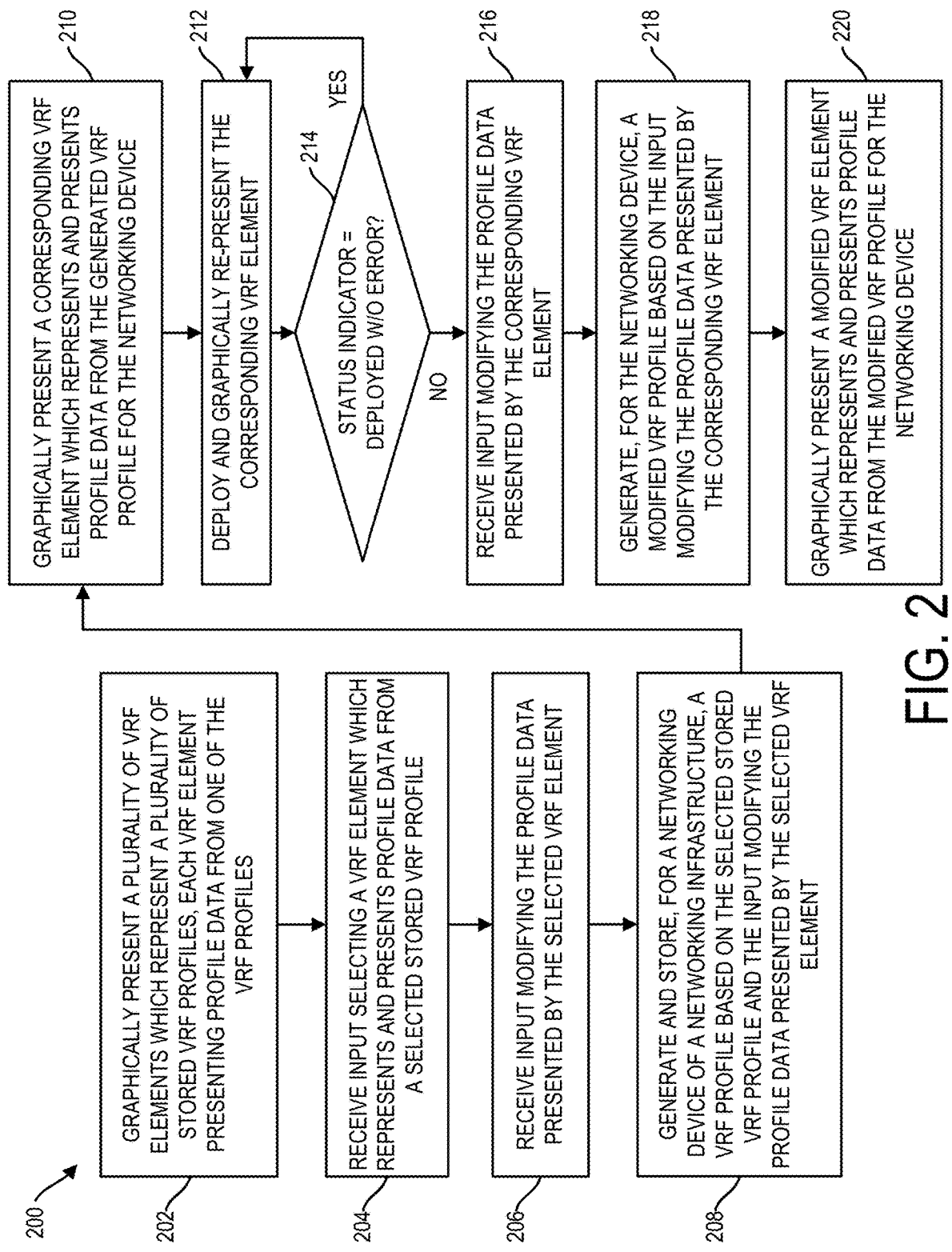
FIG. 2 depicts a flow diagram of a method for graphically managing a networking device configuration, according to one or more examples of the present disclosure.

FIG. 2 depicts a flow diagram of a method 200 for graphically managing a networking device configuration, according to one or more examples of the present disclosure. Configuration of a networking device may include initial configuration, troubleshooting during initial configuration or thereafter, or otherwise managing the networking device, such as troubleshooting, monitoring, and maintenance. Method 200 may be performed by a computing device, such as a computing device 900 described below by reference to FIG. 9. Moreover, method 200 or portions thereof may be incorporated into an overall network management system for the networking infrastructure, which may be used to manage other devices (such as servers and TOR switches) and their associated profiles, interfaces, logical and physical connections or interconnects, enclosures, protocols, software, storage, power and cooling, etc., within the networking infrastructure.

In performing method 200, the computing device graphically presents (202) a plurality of VRF elements, which represent a plurality of stored VRF profiles. Each VRF profile contains profile data, and each VRF element presents at least part of the profile data from one of the VRF profiles. The profile data enables the networking device to route data toward a destination device. The profile data may include a routing table, protocol definitions that define parameters of one or more protocols the networking device may use to route the data, characteristics or properties of the networking device (including but not limited to type of networking device and networking device identifier (ID)), etc.

The plurality of VRF elements may each include a status indicator that indicates deployment status of the represented stored VRF profile. For example, the status indicator indicates a deployment status of not deployed (e.g., INACTIVE), deployed without error (e.g., ACTIVE), or deployed with error (e.g., ACTIVE WARNING). In a particular implementation, a status indicator of deployed without error indicates that the VRF profile is deployed on a networking device and no errors were found during operation of the networking device. A status indicator of not deployed indicates that the VRF profile is not deployed on a networking device. A status indicator of deployed with error indicates that the VRF profile is deployed on a networking device but there was one or more errors associated with the deployment. Determining the status indicator may be based on analysis of the underlying profile or configuration data of the VRF profile and/or analysis of operation data resulting from operating a networking device configured using the VRF profile.

The computing device may use any suitable methodology to determine deployment status for a given VRF profile and may use any suitable database(s) to maintain intermediate and reporting statuses. In one example, the computing device performs one or more of the following tasks for each stored VRF profile. The computing device periodically monitors a pre-defined list of specific resources belonging to each routing protocol to evaluate internal state values based on protocol behavioral definitions. The computing device validates configured and any dependent values of resources belonging to the VRF profile, such as interfaces and forwarding paths for BGP neighbors (when BGP is implemented). The computing device analyzes configured values for the VRF profile resources and compares runtime values to the configured values to assign a status to the VRF profile, which may be presented in a corresponding VRF element of the VRF profile.

In an example, the plurality of VRF elements includes a VRF element that represents a stored VRF profile deployed on one networking device and a VRF element that represents a stored VRF profile deployed on a different networking device, for instance as illustrated in GUI view 100. In another example, the plurality of VRF elements includes a VRF element that represents a stored first VRF profile template for configuring a plurality of networking devices and a VRF element that represents a stored second VRF profile template for configuring a different plurality of networking devices. In a particular implementation, the first VRF profile template is associated with a first enterprise user of the networking infrastructure, and the second VRF profile template is associated with a second enterprise user of the networking infrastructure.

In an example, the computing device includes an output device, such as a display. The display may be used to graphically present the plurality of VRF elements as icons in a window (or view) of a graphical user interface. In this manner, an administrator can interact with one or more of the VRF elements, for instance using a pointer controlled by a positional input device such as a track pad, in order to configure a networking device within a networking infrastructure in accordance with the present disclosure. FIGS. 1, 3, 5, 6, and 8, described herein, illustrate example views containing one or more graphically presented VRF elements that may be used for managing configuration of a networking device.

Returning to method 200, once the VRF elements are graphically displayed, the computing device may receive (204) input, e.g., from the administrator, selecting a VRF element. The selected VRF element represents and presents data from a correspondingly selected stored VRF profile. In an example, the selected stored VRF profile is or includes a VRF profile template for configuring a plurality of networking devices. The computing device may also receive (206) input modifying the profile data presented by the selected VRF element. For example, upon receiving administrator input selecting presented profile data to be modified, the computing system presents drop-down menus or data entry windows for receiving (206) the input to modify the profile data.

Using the selected VRF profile and the input modifying the profile data presented by the selected VRF element, the computing device generates and stores (208) a VRF profile for a networking device of a networking infrastructure. In an example, the generated VRF profile includes profile data based on, for instance as a combination of, profile data from the administrator selected VRF profile and the administrator input modifying some of the profile data presented by the user selected VRF element. The computing device graphically presents (210) a corresponding VRF element that represents the generated VRF profile and presents at least some of the profile data of the generated VRF profile.

The corresponding VRF element may then be deployed (212). It should be noted that the corresponding VRF element need not be deployed contemporaneously with generating the VRF profile. Deploying the corresponding the VRF element may include receiving administrator input selecting the corresponding VRF element for deployment, such as through a button, icon, or other graphical representation of the GUI.

Correspondingly, deploying the VRF element causes the computing device to deploy the generated VRF profile into the networking device. In an example, the computing device deploys the generated VRF profile into the configuration of a networking device already connected to the infrastructure. In another example, the computing device deploys the generated VRF profile into the configuration of a networking device that is being newly connected to the infrastructure. The computing device may deploy the generated VRF profile on the networking device using an application programming interface (API) between a network management system executing on the computing device and a management application executing on the networking device, for instance using text-based commands After deployment, the corresponding VRF element is graphically re-presented (212). In an example, the corresponding VRF element is graphically re-presented with a second VRF element that represents and presents profile data from a second VRF profile for the same networking device. In another example, the corresponding VRF element is graphically re-presented with a second VRF element that represents and presents profile data from a second VRF profile for a different networking device. Deployment status may be updated and re-presented based on periodic collection and analysis of configuration and/or operational data.

When the corresponding VRF element is graphically presented (210), it may include a status indicator that indicates deployment status of the represented stored VRF profile, which in this case is the VRF profile generated at block 208. In a particular example before deployment, at block 210, the graphically presented corresponding VRF element includes a status indicator that indicates a deployment status of not deployed. Upon deploying and graphically re-presenting (212) the corresponding VRF element, if the status indicator indicates deployed without error, at decision branch 214, deployment and graphical presentation continues at block 212. Alternatively, deployment of the generated VRF profile may continue in the networking device without graphically presenting a corresponding VRF element, for instance if the administrator is no longer engaging with the GUI. Deployment status may be updated and re-presented based on periodic collection and analysis of configuration and/or operational data.

If, at decision branch 214, the status indicator does not indicate deployed without error but instead indicated deployed with error, the computing device may receive (216) administrator input modifying profile data presented by the corresponding VRF element. For example, the VRF element also identifies profile data that has an error, and the received input modifies the profile data that is indicated as being in error.

The computing device generates (218), for the networking device, a modified VRF profile based on the input modifying the profile data presented by the corresponding VRF element. The computing device may then graphically present (220) a modified VRF element, which represents and presents data from the modified VRF profile for the networking device. In an example, the modified VRF element is graphically presented with a second VRF element that represents and presents profile data from a second VRF profile for the same networking device. In another example, the modified VRF element is graphically presented with a second VRF element that represents and presents profile data from a second VRF profile for a different networking device.

Figure 3:
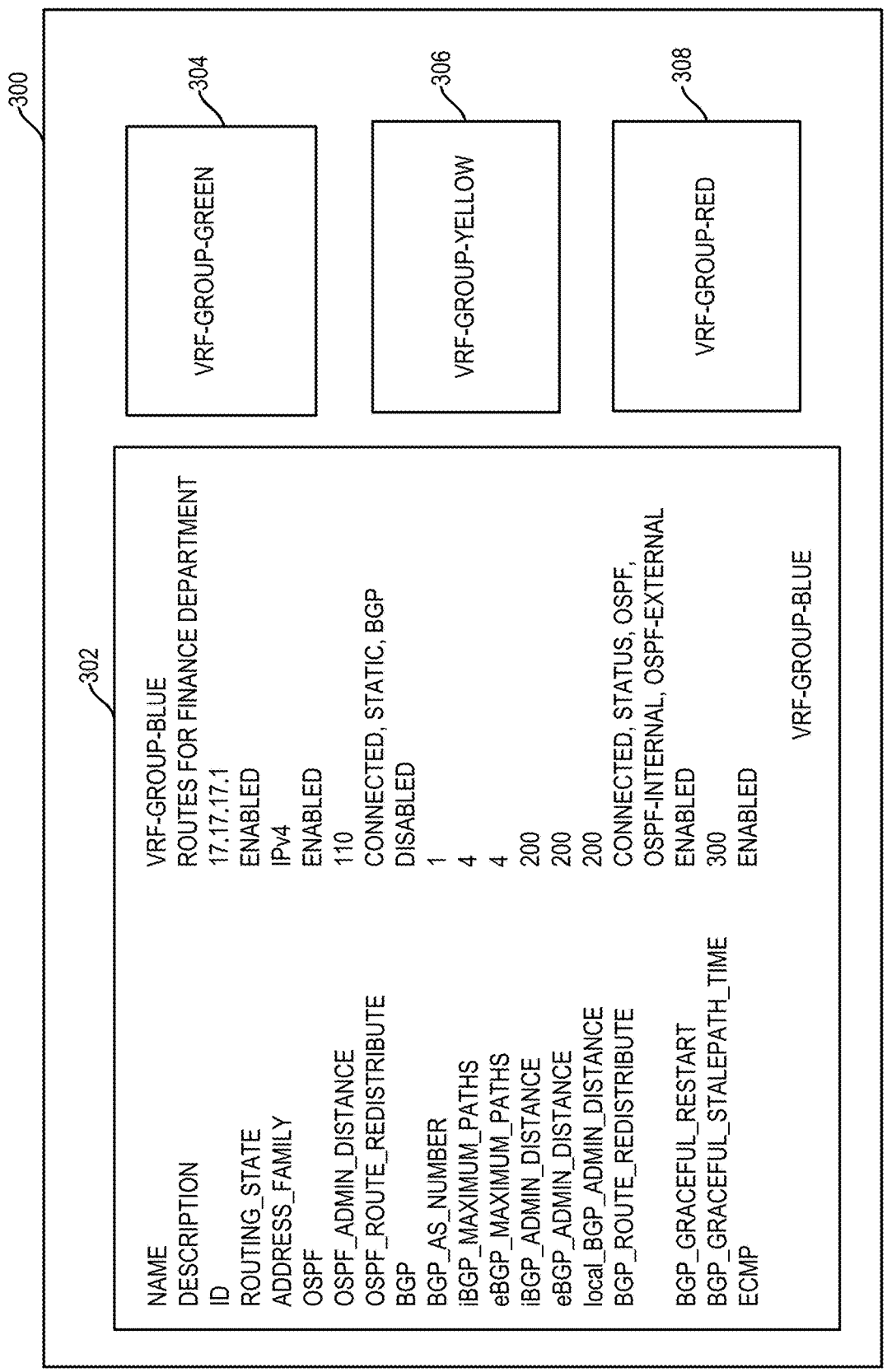
FIG. 3 depicts a plurality of graphically presented virtual routing and forwarding elements that may be used to manage a networking device configuration, according to one or more examples of the present disclosure.

FIG. 3 depicts a plurality of graphically presented VRF elements that may be used to manage a networking device configuration, according to one or more examples of the present disclosure. Illustrated therein is a GUI view 300 that depicts a VRF element 302 labeled VRF-Group-Blue, a VRF element 304 labeled VRF-Group-Green, a VRF element 306 labeled VRF-Group-Yellow, and a VRF element 308 labeled VRF-Group-Red. In an example, each VRF element 302, 304, 306, 308 represents and presents data from a different VRF profile template.

At least some of the VRF profile templates may be associated with a different enterprise user (hereinafter referred to as a customer) of the networking infrastructure.

In a particular example implementation, the different VRF profile templates, four in this case, are each associated with a different customer. The multiple VRF profile templates enable a Multi-VRF Support feature for the networking infrastructure whereby, for instance, a single networking device may be configured with multiple VRF profiles. Accordingly, a single networking device may be used to route data for different customers.

The VRF element 302 is expanded to illustrate example profile data that may be presented from the VRF profile template that the VRF element 302 represents. The expanded VRF element 302 further illustrates a plurality of descriptors that may describe, be associated with, or otherwise identify presented profile data of the VRF profile template. As illustrated, the VRF element 302 includes descriptors of "Name" with associated profile data of "VRF-Group-Blue," Description" with associated profile data of "Routes for Finance Department," "ID" with associated profile data of IP address "17.17.17.1," "Routing_State" with associated profile data of "Enabled," and "Address_Family" with associated profile data "IPv4."

In the example illustrated, Name identifies a name associated with the VRF profile template. Description identifies a group for which data is routed for a customer. ID identifies an IP address for the networking device. Routing_State identifies the state of a VRF instance, and Address_Family identifies a family or group of IP addresses from which the ID is taken.

The profile data presented by the VRF element 302 further includes protocol definitions for at least some of the protocols used by the networking device, for instance, the routing protocols used by the networking device. The protocol definitions for a given protocol define or otherwise identify one or more configuration parameters for the networking device based on the given protocol, which may include whether the given protocol is enabled or disabled for the networking device.

The VRF element 302 presents protocol definitions for OSPF, BGP, and ECMP routing protocols. As illustrated, the protocol definitions for OSPF routing protocol include "OSPF" with associated profile data of "Enabled," "OSPF_Admin_Distance" with associated profile data of 110, and "OSPF_Route_Redistribute" with associated profile data of "Connected, Static, BGP." The protocol definition for ECMP routing protocol includes "ECMP" with associated profile data of "Enabled." In the example illustrated, OSPF identifies whether or not the networking device is enabled to use the OSPF protocol. OSPF_Admin_Distance identifies an administrative distance or route preference value used to rank routes from most to least preferred. OSPF_Route_Redistribute identifies the redistribution of routes between OSPF and BGP. ECMP identifies whether or not the networking device is enabled to use the ECMP protocol.

As illustrated, the protocol definitions for BGP routing protocol includes "BGP" with associated profile data of "Disabled," "BGP_AS_Number" with associated profile data of 1, "iBGP_Maximum_Paths" with associated profile data of 4, "eBGP_Maximum_Paths" with associated profile data of 4, "iBGP_Admin_Distance" with associated profile data of 200, "eBGP_Admin_Distance" with associated profile data of 200, "localBGP_Admin_Distance" with associated profile data of 200, "BGP_Route_Redistribute" with associated profile data of "Connected, Status, OSPF, OSPF-Internal, OSPF-External," "BGP_Graceful_Restart" with associated profile data of "Enabled," and "BGP_Graceful_Stalepath_Time" with associated profile data of 300.

In the example illustrated, BGP identifies whether or not the networking device is enabled to use the BGP protocol. BGP_AS_Number identifies an autonomous system number assigned to the customer network. iBGP_Maximum_Paths and eBGP_Maximum_Paths identify the maximum number of paths the networking device can install to configure the networking device with multipath load balancing for both internal (iBGP) and external (eBGP) paths, respectively. iBGP_Admin_Distance, eBGP_Admin_Distance, and localBGP_Admin_Distance each identify an administrative distance or route preference value used to rank routes from most to least preferred for iBGP, eBGP, and local BGP routes, respectively. BGP_Route_Redistribute identifies the redistribution of routes between OSPF and BGP. BGP_Graceful_Restart identifies whether or not a BGP Graceful Restart capability is enabled that would allow a BGP speaker, or route announcer, to express its ability to preserve forwarding state during BGP restart. BGP_Graceful_Stalepath_Time identifies how long a networking device will wait before deleting stale routes after an end of record message is received from a restarting networking device.

In one approach without the use of a VRF profile template in accordance with the present disclosure, it is easy to see how configuring multiple networking devices consistent with the profile data and protocol definitions presented in VRF element 302 can be error-prone. This is especially the case when implementing a user interface whereby the networking device is discretely configured at the control plane outside of the context of all other routers to be configured consistent with the same profile data and protocol definitions. By contrast, a VRF profile template, according to the present disclosure, may be used to easily configure the same or similar profile data across multiple networking devices while minimizing configuration error, particularly as the number of routers to be configured increases.

For example, when configuring multiple networking devices to route data for the same customer, the networking devices should be configured with the unique number assigned to the customer to distinguish that customer's traffic, also referred to as a route distinguisher. In the VRF element 302, the route distinguisher is the BGP_AS_Number. If that number is incorrect for one of the routers being configured, that error is difficult to detect at the control plane across several networking devices. However, this type of error may be eliminated where the route distinguisher is contained in a VRF profile template that may be applied across the devices. Moreover, relationships between the protocols (for instance as reflected in the OSPF_Route_Redistribute and BGP_Route_Redistribute protocol definitions) that may also be difficult to apply and/or troubleshoot may be added to the VRF profile template to simplify configuration across multiple networking devices.

Figure 4:
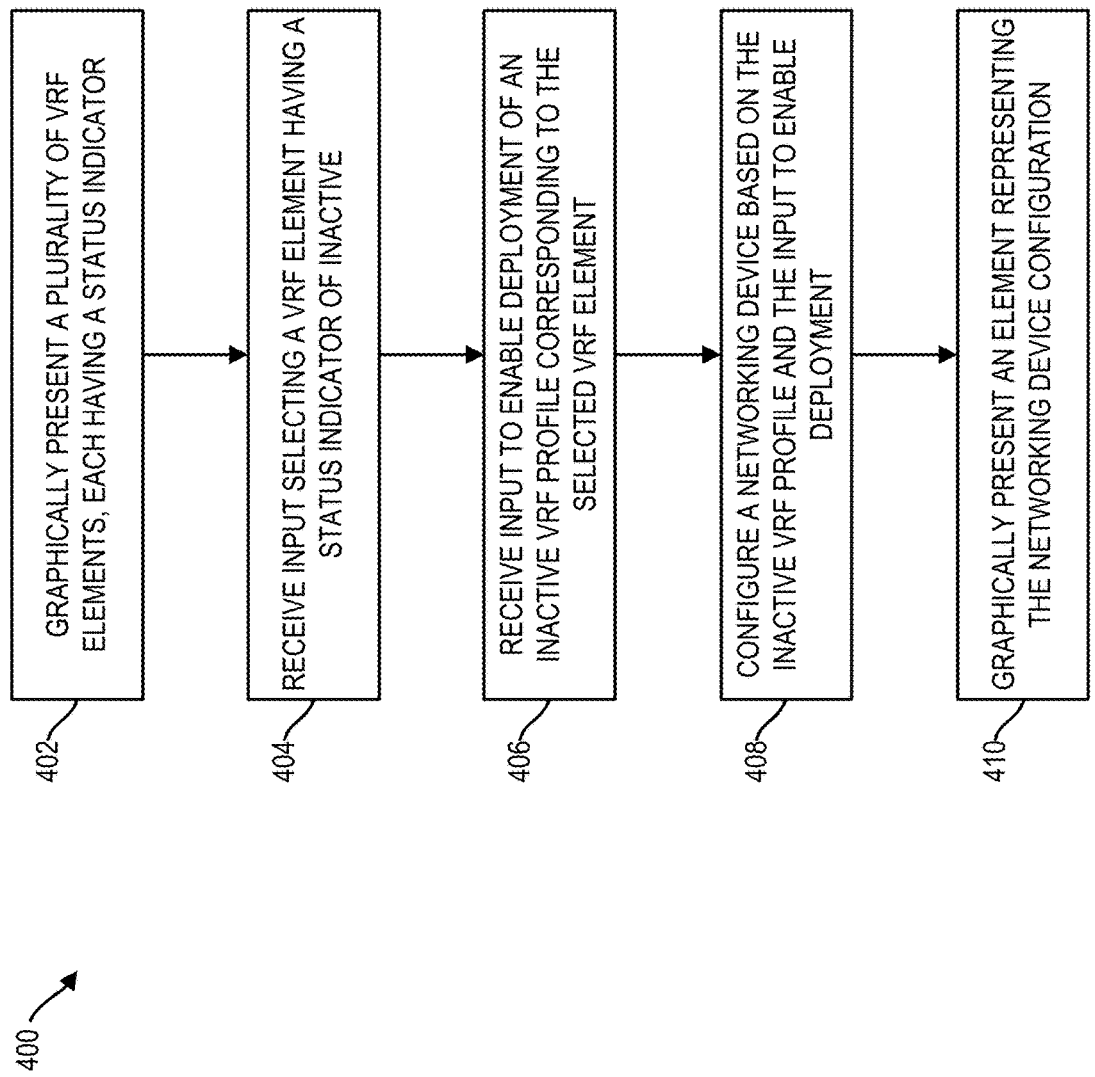
FIG. 4 depicts a flow diagram of a method for graphically managing a networking device configuration, according to one or more examples of the present disclosure.

FIG. 4 depicts a flow diagram of a method 400 for graphically managing a networking device configuration, according to one or more examples of the present disclosure. Method 400 may be performed by a computing device, such as a computing device 900 described below by reference to FIG. 9. Moreover, method 400 or portions thereof may be incorporated into an overall network management system.

Figure 5:
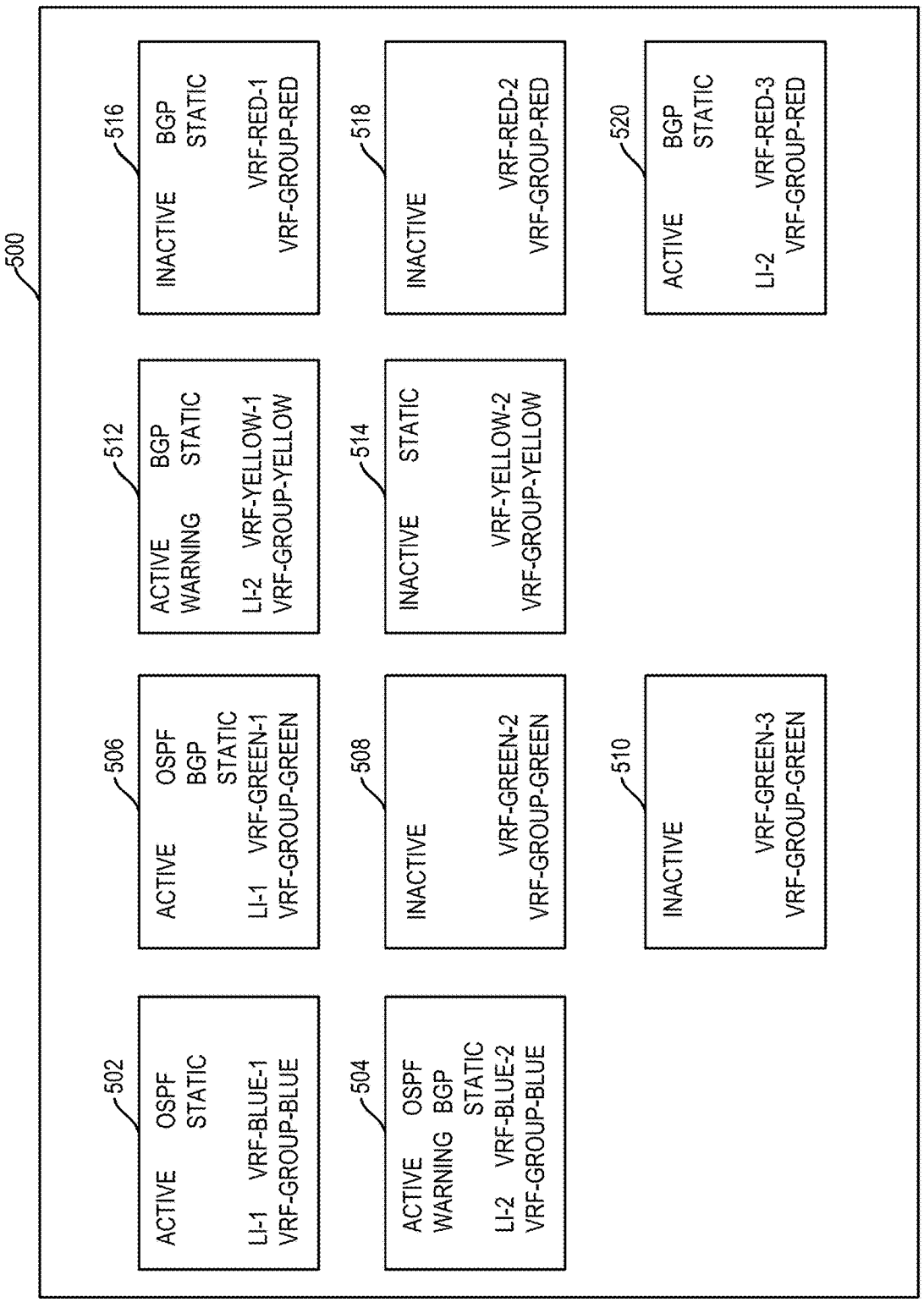
FIG. 5 depicts a plurality of graphically presented virtual routing and forwarding elements that may be used to manage a networking device configuration, according to one or more examples of the present disclosure.

Method 400 is next described by reference to a GUI view 500 illustrated in FIG. 5, wherein a plurality of graphically presented VRF elements is depicted that may be used to manage a networking device configuration, according to one or more examples of the present disclosure. In performing method 400, the computing device graphically presents (402) a plurality of VRF elements, each having a status indicator. For example, the computing device graphically presents the GUI view 500, which depicts VRF elements 502 to 520, each representing and presenting data from a different stored VRF profile and each including a status indicator indicating one of three deployment statuses (ACTIVE, ACTIVE WARNING, OR INACTIVE) of the VRF profile that is being represented. As illustrated, VRF elements 502, 506, and 520 include a status indicator indicating a status of ACTIVE. VRF elements 504 and 512 include a status indicator indicating a status of ACTIVE WARNING. VRF elements 508, 510, 514, 516, and 518 include a status indicator indicating a status of INACTIVE.

In the example illustrated, the VRF elements of the GUI view 500 are arranged or grouped by VRF label, e.g., based on the customer associated with the VRF profile. The grouping of VRF elements 502 and 504 are labeled VRF-Group-Blue. The grouping of VRF elements 506, 508, and 510 are labeled VRF-Group-Green. The grouping of VRF elements 512 and 514 are labeled VRF-Group-Yellow. The grouping of VRF elements 516, 518, and 520 are labeled VRF-Group-Red. The depicted VRF elements may present additional data, for instance additional profile data. For example, at least some of the VRF elements 502-520 depicted in GUI view 500 also identify the networking device (e.g., "LI-1" or "LI-2") in which the associated VRF profile is deployed, a unique label for the VRF instance on the networking device (e.g., "VRF-Blue-1," "VRF-Blue-2," "VRF-Green-1," "VRF-Yellow-1," and "VRF-Red-3,"), a unique label for VRF profiles that have not been deployed (e.g., "VRF-Green-2," "VRF-Green-3," "VRF-Yellow-2," "VRF-Red-1," and "VRF-Red-2,"), and properties and/or identities of the routing protocols used or that may be used in deployment (e.g., "Static," "OSPF," and "BGP").

When presented with the GUI view 500, an administrator can readily determine a number of particulars about VRF deployment in the networking infrastructure. For example, it can be seen that the networking device LI-1 has two customer VRF instances deployed thereon, VRF-Blue-1 and VRF-Green-1, in addition to a default VRF instance (shown in FIG. 1). It can also be seen that the networking device LI-2 has three customer VRF instances deployed thereon, VRF-Blue-2, VRF-Yellow-1, and VRF-Red-3, in addition to a default VRF instance (where only the default VRF instance and VRF-Blue-2 is shown in FIG. 1). Quickly viewing the number of VRF instances already deployed on the networking devices may enable an administrator to quickly select a networking device on which to deploy a VRF instance.

It can be further seen from the GUI view 500, the VRF elements that are associated with VRF profiles that have been deployed contrasted with the VRF elements that are associated with VRF profiles that have not been deployed. Thus, the GUI view 500 can further enable an administrator to select a VRF element that has a status of INACTIVE for deployment purposes. Turning again to the method 400, the computing device may receive (404) input selecting a VRF element having a status indicator of INACTIVE. In an example, the computing device receives input (for instance via an input device) that the administrator has selected VRF element 508, which has a status indicator of INACTIVE.

The computing device receives (406) further input to enable deployment of the VRF profile corresponding to the selected VRF element. For example, the administrator may be guided to define or provide additional information using input devices of the computing device. The additional information may include, but is not limited to, a type of networking device (e.g., router type), the networking device ID, etc. Example router types include internal router (IR), autonomous system boundary router (ASBR), area border router (ABR), etc. Moreover, the administrator may identify the Router ID for L1-2 (e.g., 17.17.17.1) for deployment. Using the VRF profile and the additional administrator input, the computing device may configure (408) the networking device having the designated networking device ID.

Configuration (408) may include the computing device prompting additional input from the administrator based on previous input by the administrator. For example, the administrator may define the type of router as ABR. This may trigger the computing device to request information to assist in further defining one or more areas in which the router may participate and to define connections to other routers in order to route data through or within those areas.

Configuration (408) may further include one or more properties or attributes being automatically configured into the networking device at one or more layers, e.g., layer 2 and layer 3, for instance based on the administrator input. For example, a router configuration may include introduction of a loopback interface with Router ID in a default VRF when the administrator defines the Router ID and putting a forwarding address for the Router ID loopback interface on an Uplink Set associated with the default VRF, otherwise alerting the administrator. The router configuration may include automatic creation of VTEP with the Router ID as a source ID and against additional conditions such as existence of a Network Virtual Interface (NVI). In the context of OSPF configuration, the router configuration may include restricting area configurations on interfaces based on the router type. The computing device can be programmed to provide other automated networking device configurations based on design preference.

Figure 6:
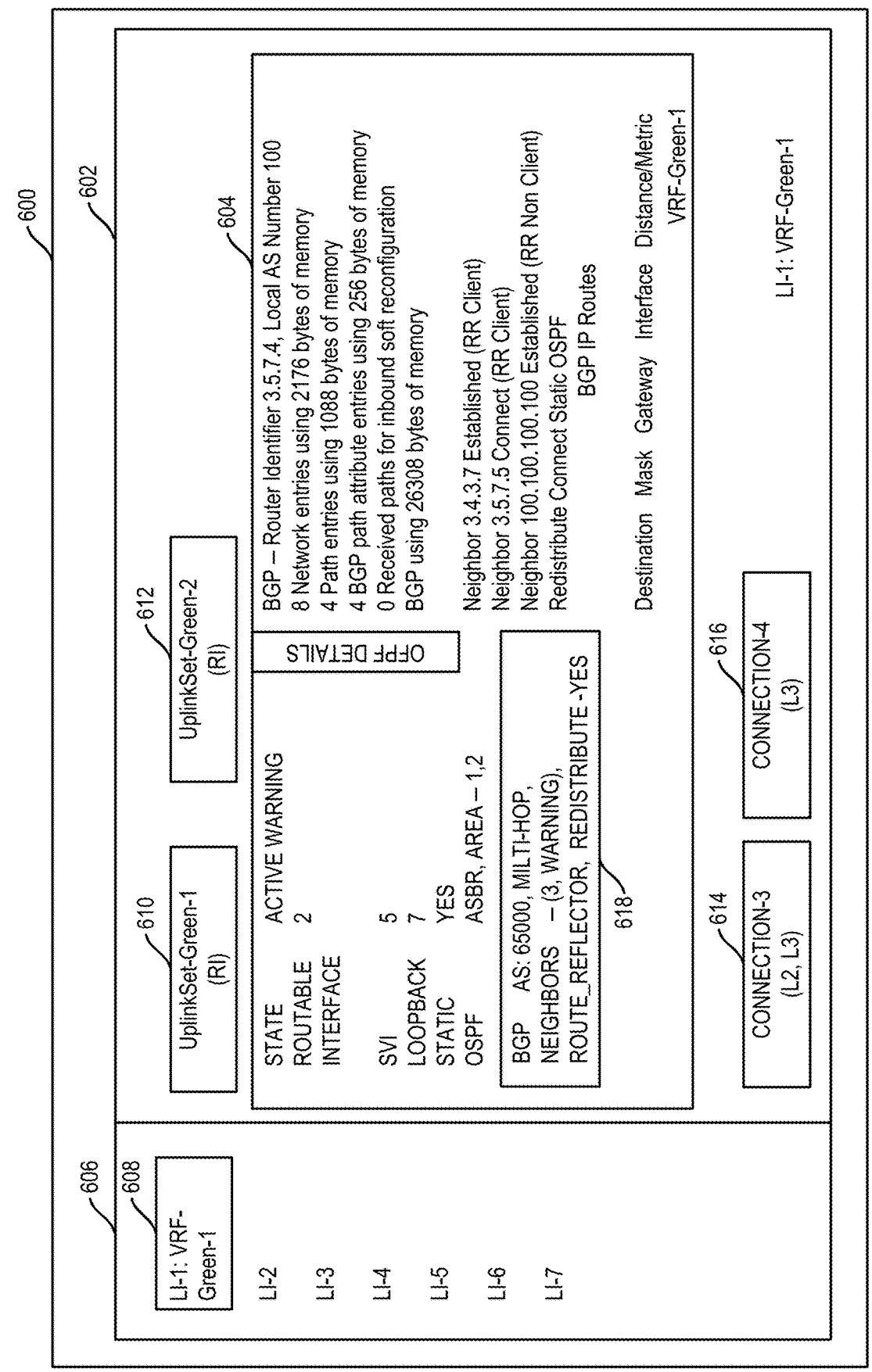
FIG. 6 depicts a graphically presented virtual routing and forwarding element that may be used to troubleshoot a networking device configuration, according to one or more examples of the present disclosure.

The networking device configuration may be stored, including storing a VRF profile generated based on VRF profile represented by the selected VRF element 508. An element or one or more icons representing the networking device configuration may be graphically presented (410). In one example, GUI view 100 (of FIG. 1) may be refreshed to re-present the networking device element 120, which depicts the configuration for LI-2, including a VRF element labeled VRF-Green-2. In another example, GUI view 500 (of FIG. 5) may be refreshed such that the VRF element 508 reflects deployment in LI-2, some routing protocol details, and a change in the status indicator to ACTIVE or ACTIVE WARNING, depending on whether the deployment was with or without error.

Where FIG. 6 depicts a graphically presented VRF element 604 that may be used to troubleshoot a networking device configuration, according to one or more examples of the present disclosure. In an example, while configuring LI-1 with the VRF profile labeled VRF-Green-1, an error occurred in the OSPF configuration. Accordingly, Illustrated in FIG. 6 is a GUI view 600 that depicts a block 602 that includes the VRF element 604 labeled VRF-Green-1 for router LI-1. Also included in the GUI view 600 is a selection block 606 that allows selecting (608) LI-1 from a plurality of LI, which also includes L1-2, L1-3, L1-4, L1-5, L1-6, and L1-7, and selecting (608) of the VRF profile labeled VRF-Green-1 deployed thereon. The list of LIs could include more or fewer LIs.

In an example, upon the administrator selecting (608) LI-1: VRF-Green-1, expanded block 602 is graphically presented, which includes the expanded VRF element 604. In a particular example, block 602 represents at least part of the configuration for LI-1, namely configuration associated with deploying VFR-Green-1 into LI-1. Accordingly, block 602 presents connection elements 610 and 612 associated with VRF element 604. The connection elements 610 and 612 respectively represent an Uplink Set labeled "Uplink-Set-GREEN-1" that maps to a first physical RI and an Uplink Set labeled "UplinkSet-GREEN-2" that maps to a second physical RI. Block 602 also presents connection elements 614 and 616 associated with VRF element 604. The connection elements 614 and 616 respectively represent a first L2, L3 downlink port connection labeled "Connection-3" that may be connected to a first server and a second downlink port connection labeled "Connection-4" that may be connected to a second server.

Figure 7:
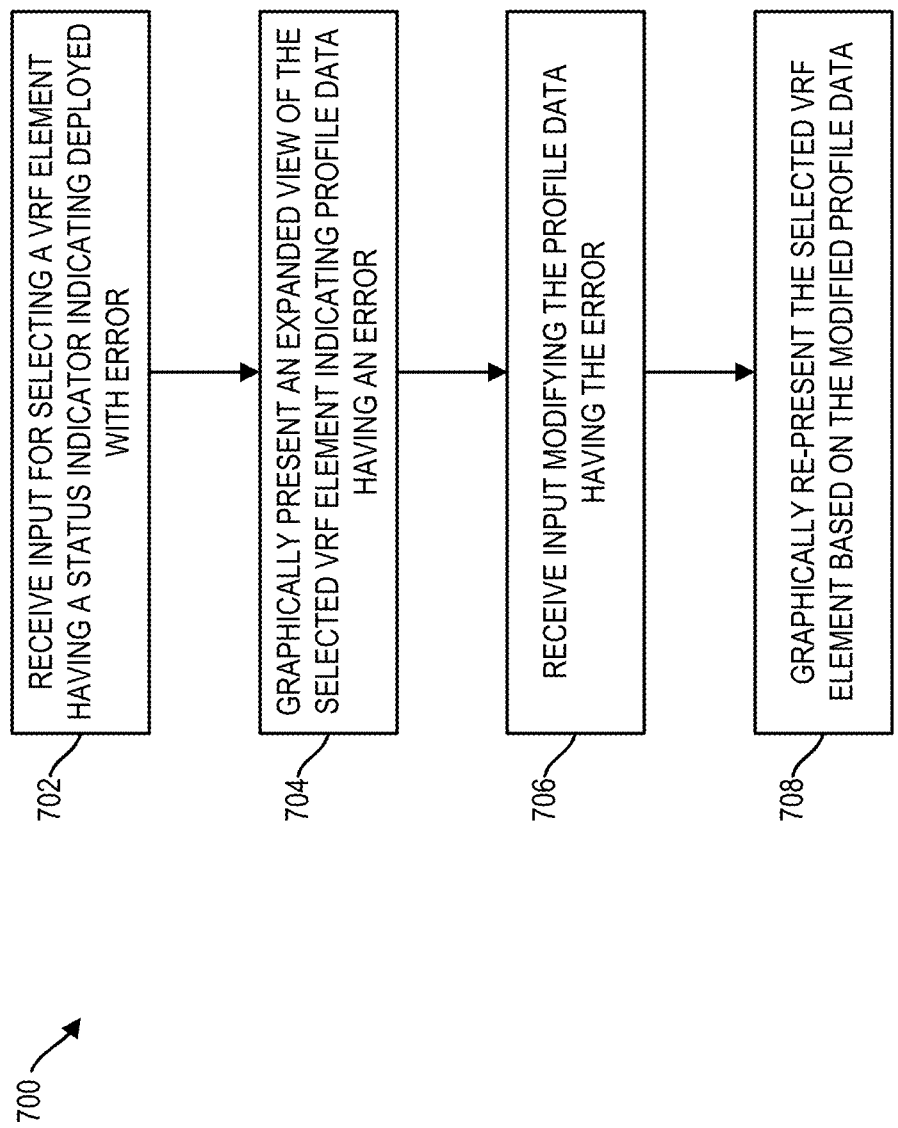
FIG. 7 depicts a flow diagram of a method for troubleshooting a networking device configuration, according to one or more examples of the present disclosure.

The depiction of VRF element 604 identifies (618) profile data having an error. Such identification enables streamlined troubleshooting of the LI-1 configuration associated with the VRF-Green-1 profile without having to wade through lines of CLI code. FIG. 7 depicts a flow diagram of a method 700 for troubleshooting a networking device configuration, according to one or more examples of the present disclosure. Method 700 may be used to troubleshoot the error identified (618) in the profile data presented in the VRF element 604. Method 700 may be performed by a computing device, such as a computing device 900 described below by reference to FIG. 9. Moreover, method 700 or portions thereof may be incorporated into an overall network management system.

In performing method 700, a computing device receives (702) input selecting a VRF element having a status indicator indicating deployed with error. In an example, the computing device receives input through a selection (608) of the VRF element 604 labeled VRF-Green-1 having a status indicator indicating a status of ACTIVE WARNING. The computing device graphically presents (704) an expanded view of the selected VRF element indicating profile data having an error. In the example, the expanded view of the VRF element 604 indicates (618) the profile or configuration data having the error. In this case, the error indicates a BGP neighbor relationship not being established, where the BGP protocol is enabled. Thus, in this case, the status indicator of ACTIVE WARNING is based on an error in the underlying configuration data. Alternatively, where one or more neighbor relationships were included in the configuration data and an error still presented upon deployment, the status indicator of ACTIVE WARNING may be based on operational data, for instance one or more of the configured neighbor relationships not being accessible. In another example, the computing device may receive (702) the input for selecting the VRF element having the status indicator indicating deployed with error from a different GUI view, for instance one similar to the GUI view 500.

The computing device may further receive (706) input modifying the profile data having the error. By reference to the example error indicated (618) in the profile data presented by the VRF element 604, the computing device may receive input modifying the BGP neighbor relationship. The computing device may then test the configuration of the networking device based on the modified profile data and graphically re-present (708) the selected VRF element based on the modified profile data. The re-presented VRF element will contain a status indicator, which can be used to alert the administrator as to whether the modified profile data caused the status indicator to change from deployed with error (ACTIVE WARNING) to deployed without error (ACTIVE).

The computing device may monitor and indicate other errors or types of error to facilitate troubleshooting in accordance with the present disclosure. For example, the computing device may indicate a VLAN interface for the VRF profile resulting in a non-operational state due to removal of the VLAN from the network management system or other application or database used by the network management system. The computing device may analyze operational state of participating interfaces and protocol specific states and indicate any errors. The computing device may analyze protocol specific behaviors and indicate any error, for instance analyzing and indicating when BGP IP prefix capacity has been exceeded. The computing device may analyze interface types and indicate the same by providing references to layer 2 details along with summarized data. The computing device may indicate when there are no active router configurations upon analyzing the VRF profiles for East-West only configurations. The computing device may present a comparative view of protocol specific telemetry data across VRF elements to assist in troubleshooting a VRF profile containing profile data having an error. Additional data may be analyzed and resulting errors reported based on the analysis to aid in troubleshooting in accordance with the present disclosure.

Figure 8:
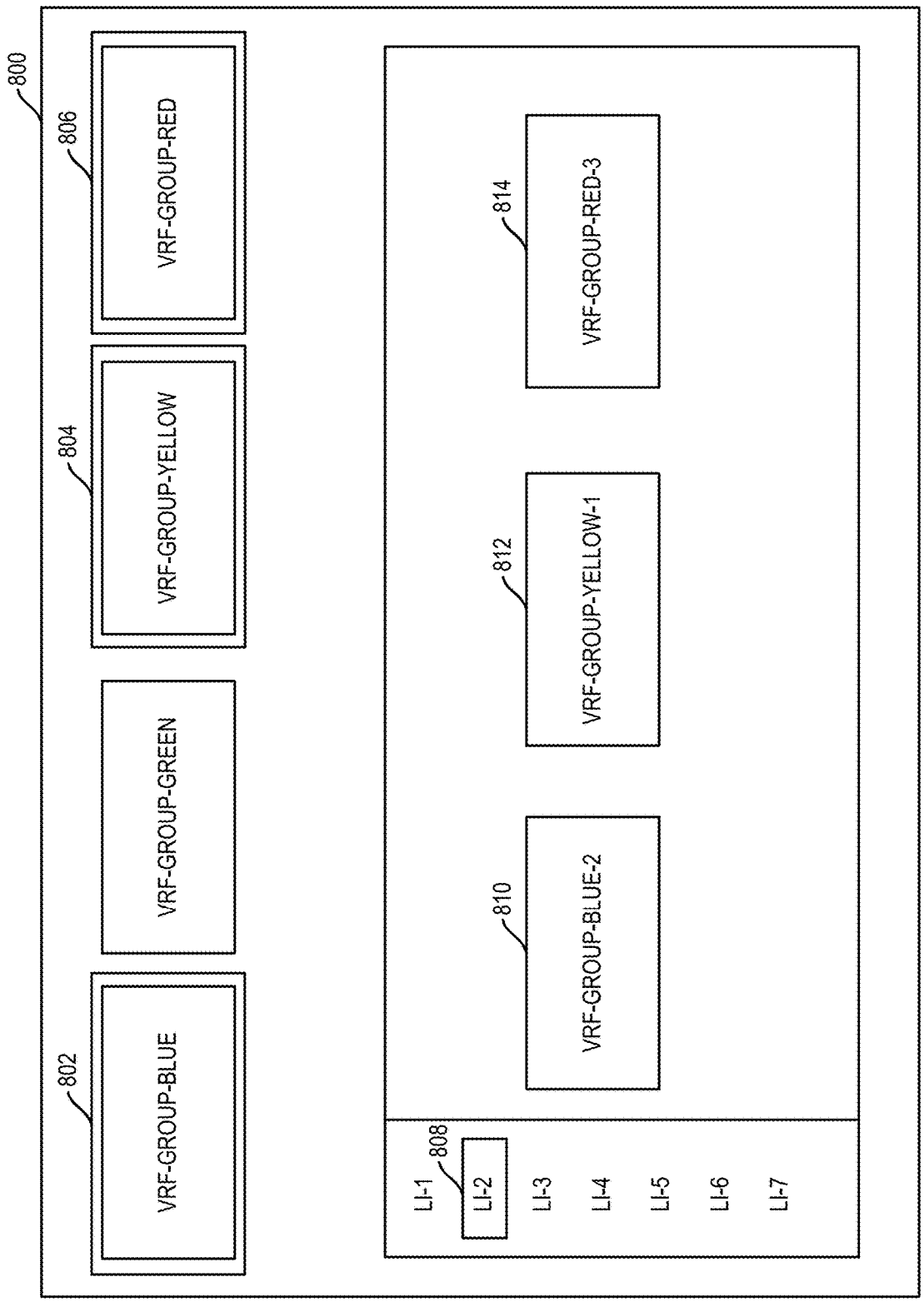
FIG. 8 depicts a plurality of graphically presented virtual routing and forwarding elements that may be used to manage a networking device configuration, according to one or more examples of the present disclosure.

FIG. 8 depicts a plurality of graphically presented VRF elements that may be used to manage a networking device configuration, according to one or more examples of the present disclosure. Illustrated therein is a GUI view 800 that may be used to depict which VRF profiles are deployed on each of a plurality of networking devices of a networking infrastructure. The GUI view 800 presents a list of networking devices LI-1, LI-2, LI-3, LI-4, LI-5, LI-6, and LI-7 from which a selection can be made. Upon receiving an input selecting one the networking devices, the computing device graphically displays one or more VRF elements corresponding to each of the VRF profiles deployed on the networking device.

In the illustrated example, networking device LI-2 is selected (808). In response thereto, the computing device graphically presents VRF elements 810, 812, and 814, which represent corresponding VRF profiles VRF-Group-Blue-2, VRF-Group-Yellow-1, and VRF-Group-Red-3, respectively, deployed on LI-2. As illustrated, also graphically presented if the VRF group (e.g., corresponding to a particular customer) within which each VRF profile is contained. Accordingly, the GUI view 800 indicates (802) that the VRF-Group-Blue-2 profile belongs to VRF-Group-Blue. The GUI view 800 indicates (804) that the VRF-Group-Yellow-1 profile belongs to VRF-Group-Yellow. The GUI view 800 indicates (806) that the VRF-Group-Red-3 profile belongs to VRF-Group-Red.

Figure 9:
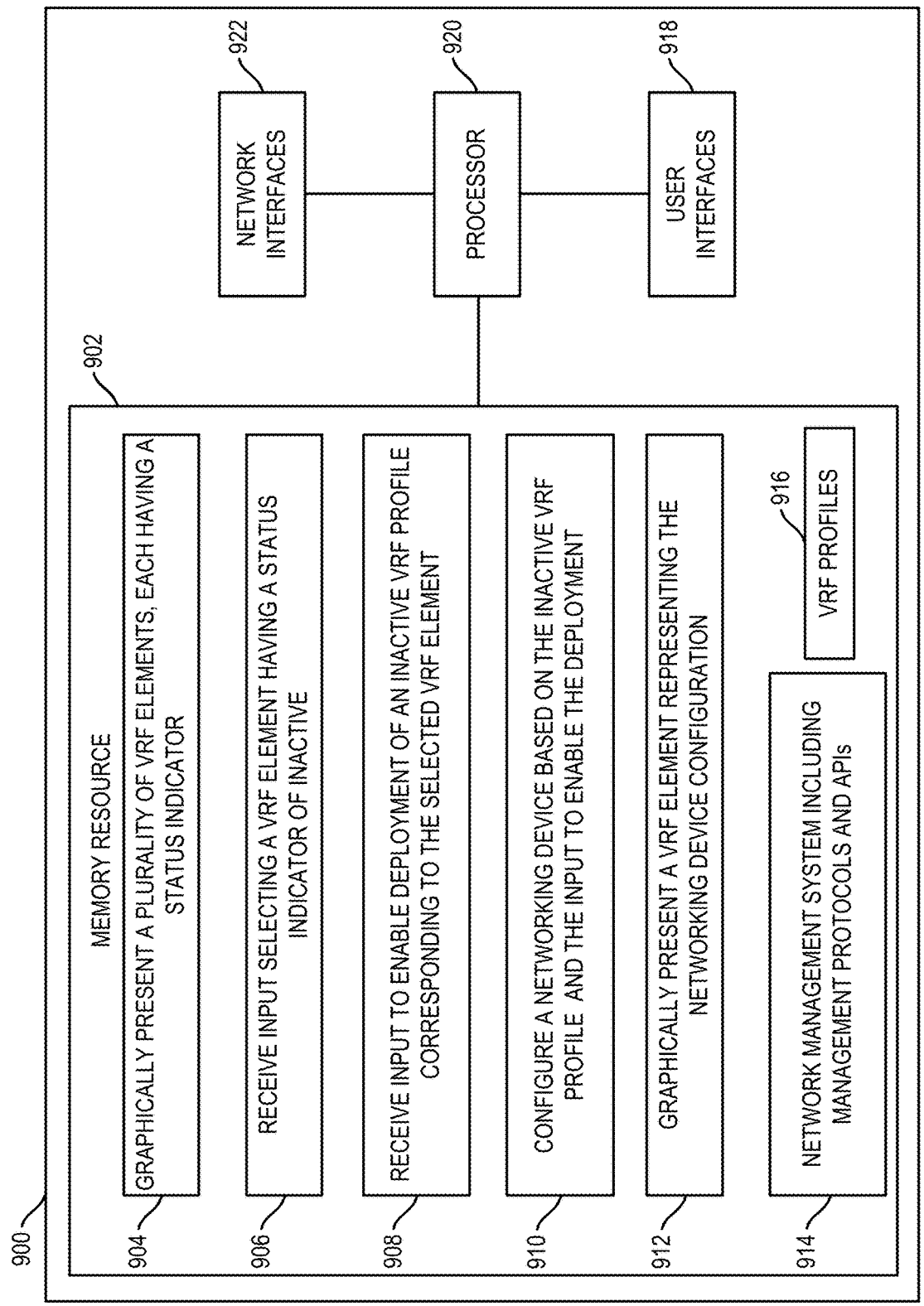
FIG. 9 depicts a computing device within which can be implemented graphically managing a networking device configuration, according to one or more examples of the present disclosure.

FIG. 9 depicts a computing device 900 within which can be implemented graphically managing a networking device configuration, according to one or more examples of the present disclosure. As illustrated, the computing device 900 includes hardware of a memory resource 902, a processor 920, network interfaces 922, and user interfaces 918, which are all operatively coupled.

The memory resource 902 may be a non-transitory medium configured to store various types of data. For example, memory resource 902 may include one or more storage devices that include a non-volatile storage device and/or volatile memory. Volatile memory, such as random-access memory (RAM), can be any suitable non-permanent storage device. The non-volatile storage devices can include one or more disk drives, optical drives, solid-state drives (SSDs), tape drives, flash memory, read only memory (ROM), and/or any other type of memory designed to maintain data for a duration of time after a power loss or shut down operation. In certain instances, the non-volatile storage devices of the memory resource 902 may be used to store a network management system 914, which may include one or more management protocols, and to store multiple VRF profiles 916, including one or more VRF profile templates, the profile data from which may be graphically presented in one or more VRF elements of a GUI.

The non-volatile storage devices of the memory resource 902 may also be used to store instructions that may be loaded into the RAM when such programs are selected for execution. In an example, the memory resource 902 stores executable instructions that, when executed by the processor 920, cause the processor 920 to perform one or more methods or portions thereof for managing a networking device configuration. In a particular example, the executable instructions may cause the processor 920 to perform one or more of the methods 200, 400, or 700 or portions thereof in accordance with the present disclosure.

As illustrated, the memory resource 902 stores executable instructions 904, 906, 908, 910, and 912. Instruction 904, when executed by the processor 920, causes the processor 920 to graphically present a plurality of VRF elements, each having a status indicator. Instruction 906, when executed by the processor 920, causes the processor 920 to receive input selecting a VRF element having a status indicator of INACTIVE. Instruction 908, when executed by the processor 920, causes the processor 920 to receive input to enable deployment of an inactive VRF profile corresponding to the selected VRF element. Instruction 910, when executed by the processor 920, causes the processor 920 to configure a networking device based on the inactive VRF profile and the input to enable the deployment. Instruction 912, when executed by the processor 920, causes the processor 920 to graphically present a VRF element representing the networking device configuration.

The processor 920 may contain one or more hardware processors, where each hardware processor may have a single or multiple processor cores. Examples of processors include, but are not limited to, a central processing unit (CPU) and a microprocessor. Although not illustrated in FIG. 9, the processing elements that make up processor 920 may also include one or more of other types of hardware processing components, such as graphics processing units (GPU), application specific integrated circuits (ASICs), field-programmable gate arrays (FPGAs), and/or digital signal processors (DSPs).

The network interfaces 922 facilitate a network connection, for example a connection to the networking infrastructure that includes the networking devices illustrated in the GUI view 100 shown in FIG. 1. For instance, the network interfaces 922 may enable the computing device 900 to connect to a networking device for managing the networking device configuration in accordance with the present disclosure. In an example, the network interfaces 922 are part of a network communication unit that may include a wired communication component and/or a wireless communications component, which may be communicatively coupled to the processor 920. The network communication unit may utilize any of a variety of proprietary or standardized network protocols, such as Ethernet, TCP/IP, to name a few of many protocols, to effect communications between devices. Network communication units may also include one or more transceiver(s) that utilize the Ethernet, power line communication (PLC), WiFi, cellular, and/or other communication methods.

The users interfaces 918 may include input and output devices. The input and output devices may include a display upon which a GUI including one or more VRF elements in accordance with the present disclosure may be presented, a positional input device (such as a mouse, touchpad, touchscreen, or the like), a keyboard, or other forms of input and output devices. When the output devices of the user interfaces 918 is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 900 may include other components well known in the art, such as sensors, powers sources, and/or analog-to-digital converters, not explicitly shown in FIG. 9.

FIG. 10 depicts a non-transitory computer-readable storage medium 1000 storing executable instructions for graphically managing a networking device configuration, according to one or more examples of the present disclosure. In an example, the non-transitory computer-readable storage medium 1000 stores executable instructions that, when executed by a processor, such as the processor 920, cause the processor to perform one or more methods or portions thereof for graphically managing a networking device configuration. In a particular example, the executable instructions may cause the processor to perform one or more of the methods 200, 400, or 700 or portions thereof in accordance with the present disclosure.

As illustrated, the non-transitory computer-readable storage medium 900 stores executable instructions 1002, 1004, and 1006. Instruction 1002, when executed by the processor, causes the processor to receive input selecting one of a plurality of graphically presented VRF elements each representing different VRF profile templates. Instruction 1004, when executed by the processor, causes the processor to receive input to create an inactive VRF profile from the VRF profile template corresponding to the selected VRF element. Instruction 1006, when executed by the processor, causes the processor to graphically present a VRF element representing the inactive VRF profile.

The non-transitory computer-readable storage medium 1000 may be any available medium that may be accessed by a computing device. By way of example, the non-transitory computer-readable storage medium 1000 may include RAM, ROM, EEPROM, CD-ROM or other optical disk storage, magnetic disk storage or other magnetic storage devices, or any other medium that may be used to carry or store desired program code in the form of instructions or data structures and that may be accessed by a computing device. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

As used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method comprising:
generating first data to graphically present a first plurality of virtual routing and forwarding elements which represent a second plurality of stored virtual routing and forwarding profiles, wherein each virtual routing and forwarding element of the first plurality presenting at least a subset of first profile data of an associated stored virtual routing and forwarding profile of the second plurality, a first virtual routing and forwarding element of the first plurality comprises a first template, the first template comprises routing protocol configuration parameters associated with at least one routing protocol, the first template is associated with a plurality of networking devices, and the routing protocol configuration parameters comprise at least one routing protocol configuration parameter value shared in common by the plurality of networking devices;
receiving input selecting the first virtual routing and forwarding element;
receiving input modifying the first profile data associated with the stored virtual routing and forwarding profile represented by the first virtual routing and forwarding element;
generating, for a first networking device of the plurality of networking devices, second profile data representing a second virtual routing and forwarding profile based on the stored virtual routing and forwarding profile associated with the first virtual routing and forwarding element and the input modifying the first profile data, wherein the second profile data to be deployed on the first networking device to form an instance of the second virtual routing and forwarding profile; and
generating second data to graphically present a second virtual routing and forwarding element which represents the second virtual routing and forwarding profile and presents at least a subset of the second profile data.

2. The method of claim 1, wherein each virtual routing and forwarding element of the first plurality comprises a status indicator that indicates a deployment status of the associated stored virtual routing and forwarding profile.

3. The method of claim 2, wherein the status indicator indicates a deployment status of:
not deployed;
deployed without error; or
deployed with error.

4. The method of claim 3, wherein the status indicator indicates a deployment status of deployed with error for the first virtual routing and forwarding element.

5. The method of claim 1, wherein the first virtual routing and forwarding element identifies an error associated with the first profile data of the associated stored virtual routing and forwarding profile.

6. The method of claim 1, wherein the first plurality further comprises:
a third virtual routing and forwarding element which represents a stored second virtual routing and forwarding profile of the second plurality deployed on a second networking device of the plurality of networking devices.

7. The method of claim 1, wherein the first plurality further comprises a third virtual routing and forwarding element comprising a second template associated with another plurality of networking devices.

8. The method of claim 7, wherein the first template is associated with a first enterprise user of the networking infrastructure, and the second template is associated with a second enterprise user of the networking infrastructure.

9. The method of claim 1, further comprising generating third data to graphically present a third virtual routing and forwarding element with the second first virtual routing and forwarding element, the third virtual routing and forwarding element representing and presenting profile data from another virtual routing and forwarding profile for the first networking device.

10. The method of claim 1, further comprising generating third data to graphically present a third virtual routing and forwarding element with the second virtual routing and forwarding element, the third virtual routing and forwarding element representing and presenting profile data from a virtual routing and forwarding profile for a second networking device other than the first networking device.

11. The method of claim 1, wherein the second virtual routing and forwarding element comprises a status indicator that indicates a deployment status of deployed with error, the method further comprising:
receiving input for selecting the second virtual routing and forwarding element;
generating third data to graphically present an expanded view of the second virtual routing and forwarding element indicating an error in the second profile data;
receiving input modifying a portion of the second profile data associated with the error; and
generating fourth data to graphically re-present the second virtual routing and forwarding element based on the modified portion of the second profile data.

12. The method of claim 1, wherein the at least one routing protocol configuration parameter value comprises a route distinguisher to distinguish a traffic associated with the plurality of networking devices.

13. The method of claim 1, wherein the at least one routing protocol comprises multiple routing protocols, and the at least one routing protocol configuration parameter value comprises a routing protocol relationship parameter representing a relationship between the multiple routing protocols.

14. A non-transitory computer-readable storage medium comprising executable instructions that, when executed by a processor, cause the processor to:
receive input selecting a first virtual routing and forwarding element of a first plurality of graphically displayed virtual routing and forwarding elements, wherein the first plurality represents a second plurality of stored virtual routing and forwarding profiles, wherein each virtual routing and forwarding element of the first plurality presenting at least a subset of first profile data of an associated stored virtual routing and forwarding profile of the second plurality, the first given virtual routing and forwarding element comprises a first template, the first template comprises routing protocol configuration parameters associated with at least one routing protocol, the first template is associated with a plurality of networking devices, and the routing protocol configuration parameters comprise at least one routing protocol configuration parameter value shared in common by the plurality of networking devices;

receive input modifying the first profile data associated with the stored virtual routing and forwarding profile represented by the first virtual routing and forwarding element;

generate, for a networking device of the plurality of networking devices, second profile data representing a second virtual routing and forwarding profile based on the stored virtual routing and forwarding profile associated with the first virtual routing and forwarding element and the input modifying the first profile data, wherein the second profile data to be deployed on the networking device to form an instance of the first virtual routing and forwarding profile; and generate data to graphically present a second virtual routing and forwarding element which represents the second virtual routing and forwarding profile and presents at least a subset of the second profile data.

15. The non-transitory computer-readable storage medium of claim 14, comprising executable instructions that, when executed by the processor, further cause the processor to:

generate the second data to graphically present the second virtual routing and forwarding element with a status indicator that indicates inactive.

16. The non-transitory computer-readable storage medium of claim 15, comprising executable instructions that, when executed by the processor, further cause the processor to:

generate data to graphically present a third virtual routing and forwarding element with the second virtual routing and forwarding element, the third virtual routing and forwarding element comprising a status indicator that indicates an inactive status, an active status, or an active warning status.

17. The non-transitory computer-readable storage medium of claim 14, wherein each virtual routing and forwarding element of the first plurality comprises a status indicator that indicates a deployment status of the associated stored virtual routing and forwarding profile.

18. The non-transitory computer-readable storage medium of claim 17, wherein the status indicator indicates a deployment status of:
not deployed;
deployed without error; or
deployed with error.

19. A computing device comprising:
a processor; and
a memory resource coupled to the processor, the memory resource including executable instructions that, when executed by the processor, cause the processor to:

generate first data to graphically present a first plurality of virtual routing and forwarding elements which represent a second plurality of stored virtual routing and forwarding profiles, wherein each virtual routing and forwarding element of the first plurality presenting at least a subset of first profile data of an associated stored virtual routing and forwarding profile of the second plurality, a first virtual routing and forwarding element of the first plurality comprises a template, the template comprises routing protocol configuration parameters associated with at least one routing protocol, the template is associated with a plurality of networking devices, and the routing protocol configuration parameters comprise at least one routing protocol configuration parameter value shared in common by the plurality of networking devices;

receive input selecting the first virtual routing and forwarding element;

receive input modifying the first profile data associated with the stored virtual routing and forwarding profile represented by the first virtual routing and forwarding element;
and generate, for a first networking device of the plurality of networking devices, second profile data representing a second virtual routing and forwarding profile based on the stored virtual routing and forwarding profile associated with the given virtual routing and forwarding element and the input modifying the first profile data, wherein the second profile data to be deployed on the first networking device to form an instance of the first virtual routing and forwarding profile; and generate second data to graphically present a second virtual routing and forwarding element which represents the second virtual routing and forwarding profile and presents at least a subset of the second profile data.

20. The computing device of claim 19, wherein the memory resource further includes executable instructions that, when executed by the processor, further cause the processor to:

generate the second data to graphically present the second virtual routing and forwarding element to include a status indicator that indicates a deployment status of active warning;

receive input selecting the second virtual routing and forwarding element;

generate third data to graphically present an expanded view of the second virtual routing and forwarding element indicating profile data having an error;

receive input modifying a portion of the second profile data having the error to provide modified second profile data; and generate fourth data to graphically re-present the second virtual routing and forwarding element based on the modified second profile data.

21. The computing device of claim 19, wherein the memory resource further includes executable instructions that, when executed by the processor, further cause the processor to:

generate fifth data to graphically present with the second virtual routing and forwarding element a third virtual routing and forwarding element representing a configuration for a second networking device.

* * * * *